United States Patent
Lambert et al.

(10) Patent No.: US 11,243,081 B2
(45) Date of Patent: Feb. 8, 2022

(54) SLAM ASSISTED INS

(71) Applicant: Trimble Inc., Sunnyvale, CA (US)

(72) Inventors: Andrew Lambert, Richmond Hill (CA); Keith Leung, Richmond Hill (CA)

(73) Assignee: Trimble Inc., Sunnyvale, CA (US)

( * ) Notice: Subject to any disclaimer, the term of this patent is extended or adjusted under 35 U.S.C. 154(b) by 184 days.

(21) Appl. No.: 16/369,720

(22) Filed: Mar. 29, 2019

(65) Prior Publication Data
US 2020/0309529 A1 Oct. 1, 2020

(51) Int. Cl.
*G01C 21/16* (2006.01)
*G01C 21/18* (2006.01)
*G01C 21/20* (2006.01)

(52) U.S. Cl.
CPC .......... *G01C 21/165* (2013.01); *G01C 21/18* (2013.01); *G01C 21/206* (2013.01)

(58) Field of Classification Search
CPC G01C 21/206; G01C 21/165; G01C 21/1652; G01C 21/18; G01C 21/3848; G05D 1/0274; G05D 1/0246; G05D 1/027
See application file for complete search history.

(56) References Cited

U.S. PATENT DOCUMENTS

2016/0349057 A1* 12/2016 Abramson Liani .... G01C 21/12
2018/0204338 A1* 7/2018 Narang ..................... G06T 7/55
2020/0377088 A1* 12/2020 Fukushige ......... G01C 21/3407

FOREIGN PATENT DOCUMENTS

WO 2018/071416 A1 4/2018
WO WO-2018071416 A1 * 4/2018 .......... G01S 7/4808

OTHER PUBLICATIONS

Hesch, J. et al., "A Laser-Aided Inertial Navigation System (L-INS) for Human Localization in Unknown Indoor Environments," 2010 IEEE International Conference on Robotics and Automation Anchorage Convention District, May 3-8, 2010, Anchorage, Alaska, USA (Year: 2010).*
Extended European Search Report for Application No. 20165138.7-1001, dated Aug. 24, 2020, 12 pages.
(Continued)

*Primary Examiner* — Rachid Bendidi
(74) *Attorney, Agent, or Firm* — Kilpatrick Townsend & Stockton LLP

(57) ABSTRACT

A navigation system for a dynamic platform includes an inertial navigation system (INS) unit for measuring, in real-time, linear accelerations and angular velocities of the dynamic platform, and determining, using dead reckoning, initial estimates of current poses of the dynamic platform based on a previous pose of the dynamic platform and the linear accelerations and angular velocities of the dynamic platform. The navigation system further includes an exteroceptive sensor for acquiring sequential images of an environment in which the dynamic platform is traveling, a simultaneous localization and mapping (SLAM) unit for estimating visual odometer (VO) pose changes of the dynamic platform using the sequential images, and a sensor fusion engine for determining estimates of current poses of the dynamic platform based at least in part on the initial estimates of current poses determined by the INS unit and the VO pose changes estimated by the local sub-map tracker.

18 Claims, 7 Drawing Sheets

(56) References Cited

OTHER PUBLICATIONS

Hesch, J. et al., "A Laser-Aided Inertial Navigation System (L-INS) for Human Localization in Unknown Indoor Environments," 2010 IEEE International Conference on Robotics and Automation Anchorage Convention District, May 3-8, 2010, Anchorage, Alaska, USA, 7 pages.
Degen, C. et al., "Evaluation of a Coupled Laser Inertial Navigation System for Pedestrian Tracking," Information Fusion (FUSION), 2015 15$^{th}$ International Conference on IEEE, Jul. 9, 2012 pp. 1292-1299.

* cited by examiner

SLAM ASSISTED INS

BACKGROUND

An inertial navigation system (INS) is a navigation device that uses motion sensors and rotation sensors to continuously calculate, by dead reckoning, the pose and velocity of a moving object. The term "pose" used herein refers to the position and orientation of an object. The term "velocity" used herein refers to the speed and direction of movement of an object. In navigation, dead reckoning is the process of calculating a current pose by using a previously determined pose, or fix, and advancing that pose based on integrating known or estimated velocities over elapsed time and course.

An INS may be subject to integration drift. Small errors in the measurements of acceleration and angular velocity may be integrated into progressively larger errors in velocity, which may be compounded into still greater errors in pose. Since a new pose is calculated from the previous calculated pose and the measured acceleration and angular velocity, these errors approximately accumulate proportionally to the time since the initial pose was input. In fact, because the velocity error also increases with time, the pose error may increase at a superlinear rate. Therefore, an INS may need additional measurements from external sources to correct its pose fixes from time to time.

SUMMARY

According to some embodiments, a navigation system for a dynamic platform includes an inertial navigation system (INS) unit. The INS unit includes a three-axis accelerometer attached to the dynamic platform for measuring, in real-time, linear accelerations of the dynamic platform along three orthogonal spatial axes, a three-axis gyroscope attached to the dynamic platform for measuring, in real-time, angular velocities of the dynamic platform along three orthogonal angular axes, and a processor communicatively coupled to the accelerometer and the gyroscope. The processor is configured to determine in real-time, using dead reckoning, initial estimates of current positions and initial estimates of current orientations of the dynamic platform based on a previous position and a previous orientation of the dynamic platform, and the linear accelerations and angular velocities of the dynamic platform. The navigation system further includes an exteroceptive sensor attached to the dynamic platform and configured to acquire, in real-time, sequential images of an environment in which the dynamic platform is traveling, and a simultaneous localization and mapping (SLAM) unit coupled to the exteroceptive sensor. The SLAM unit includes a local sub-map tracker configured to estimate, in real-time, visual odometer (VO) pose changes of the dynamic platform using the sequential images. Each VO pose change includes a change of position and a change of orientation of the dynamic platform. The navigation system further includes a sensor fusion engine communicatively coupled to the INS unit and the SLAM unit. The sensor fusion engine is configured to determine estimates of current positions and estimates of current orientations of the dynamic platform based at least in part on the initial estimates of current positions and the initial estimates of current orientations determined by the INS unit, and the VO pose changes estimated by the local sub-map tracker. The processor of the INS unit is further configured to update the initial estimates of current positions and the initial estimates of current orientations of the dynamic platform to obtain absolute current positions and absolute current orientations of the dynamic platform using the estimates of current positions and the estimates of current orientations of the dynamic platform determined by the sensor fusion engine.

According to some embodiments, a method of navigation for a dynamic platform includes measuring in real-time, using a three-axis accelerometer attached to the dynamic platform, linear accelerations of the dynamic platform along three orthogonal spatial axis, measuring in real-time, using a three-axis gyroscope attached to the dynamic platform, angular velocities of the dynamic platform along three orthogonal angular axis, and determining in real-time initial estimates of current positions and initial estimates of current orientations of the dynamic platform based on a previous position and a previous orientation, and the linear accelerations and the angular velocities of the dynamic platform using dead reckoning. The method further includes acquiring in real-time, using an exteroceptive sensor attached to the dynamic platform, sequential images of an environment in which the dynamic platform is traveling, and estimating in real-time visual odometer (VO) pose changes of the dynamic platform based on the sequential images using a SLAM algorithm. Each VO pose change includes a change of position and a change of orientation of the dynamic platform. The method further includes determining in real-time, using a sensor fusion engine, estimates of current positions and estimates of current orientations of the dynamic platform based at least in part on the initial estimates of current positions and the initial estimates of current orientations, and the VO pose changes, and updating the initial estimates of current positions and the initial estimates of current orientations of the dynamic platform to obtain absolute current positions and absolute current orientations of the dynamic platform using the estimates of current positions and the estimates of current orientations of the dynamic platform determined by the sensor fusion engine.

DETAILED DESCRIPTION

An INS may include an inertial measurement unit (IMU). An IMU may include three accelerometers (which may be referred to herein as a three-axis accelerometer) for measuring an object's linear accelerations along three orthogonal directions, and three gyroscopes (which may be referred to herein as a three-axis gyroscope) for measuring the object's angular velocities in three orthogonal angular axes.

Recent advances in the construction of microelectromechanical systems (MEMS) have made it possible to manufacture small, light, and relatively inexpensive INS's. INS's are used on vehicles such as ships, aircraft, submarines, guided missiles, spacecraft, and cars.

An INS can detect changes in the pose of an object. To determine an absolute pose, the INS may need to be initialized with a starting pose. For example, the starting pose may be obtained from global navigation satellite systems (GNSS) signals, or by exteroceptive sensing (e.g., by reference to one or more targets with a known positions). Thereafter, the INS may compute the updated position, velocity, and orientation by integrating information received from the accelerometers and gyroscopes. The advantage of an INS is that it requires no external references in order to determine its position, orientation, or velocity once the INS has been initialized.

As discussed above, an INS may be subject to integration drift, and may need additional measurements from external sources to correct its position fixes from time to time. For instance, a wheel odometer may be used to estimate the actual distance travelled by a car, which can be used to correct drifts in an INS. When the car is stationary, the wheel odometer may indicate that the car has not traveled any distance; yet an IMU in the INS may erroneously indicate that the car has moved due to some random noise in the IMU. The INS may correct the erroneous IMU measurements using the wheel odometer measurements. GNSS signals may also be used to provide periodic corrections to the position fixes by the INS.

Embodiments of the present invention provide systems and methods of navigation using INS assisted by simultaneous localization and mapping (SLAM). SLAM may provide additional measurements that can be used to correct the drifts in the pose estimates by the INS. SLAM is the computational problem of constructing or updating a map of an unknown environment through exteroceptive sensing while simultaneously keeping track of a sensor's pose within it. SLAM has been employed in self-driving cars, unmanned aerial vehicles, autonomous underwater vehicles, planetary rovers, domestic robots, and the like. For example, SLAM may allow a vehicle to concurrently build a map and locate itself in the map. SLAM may replace or supplement a wheel odometer. SLAM may also replace or supplement GNSS signals when GNSS coverage is not available or is poor.

Figure 1:
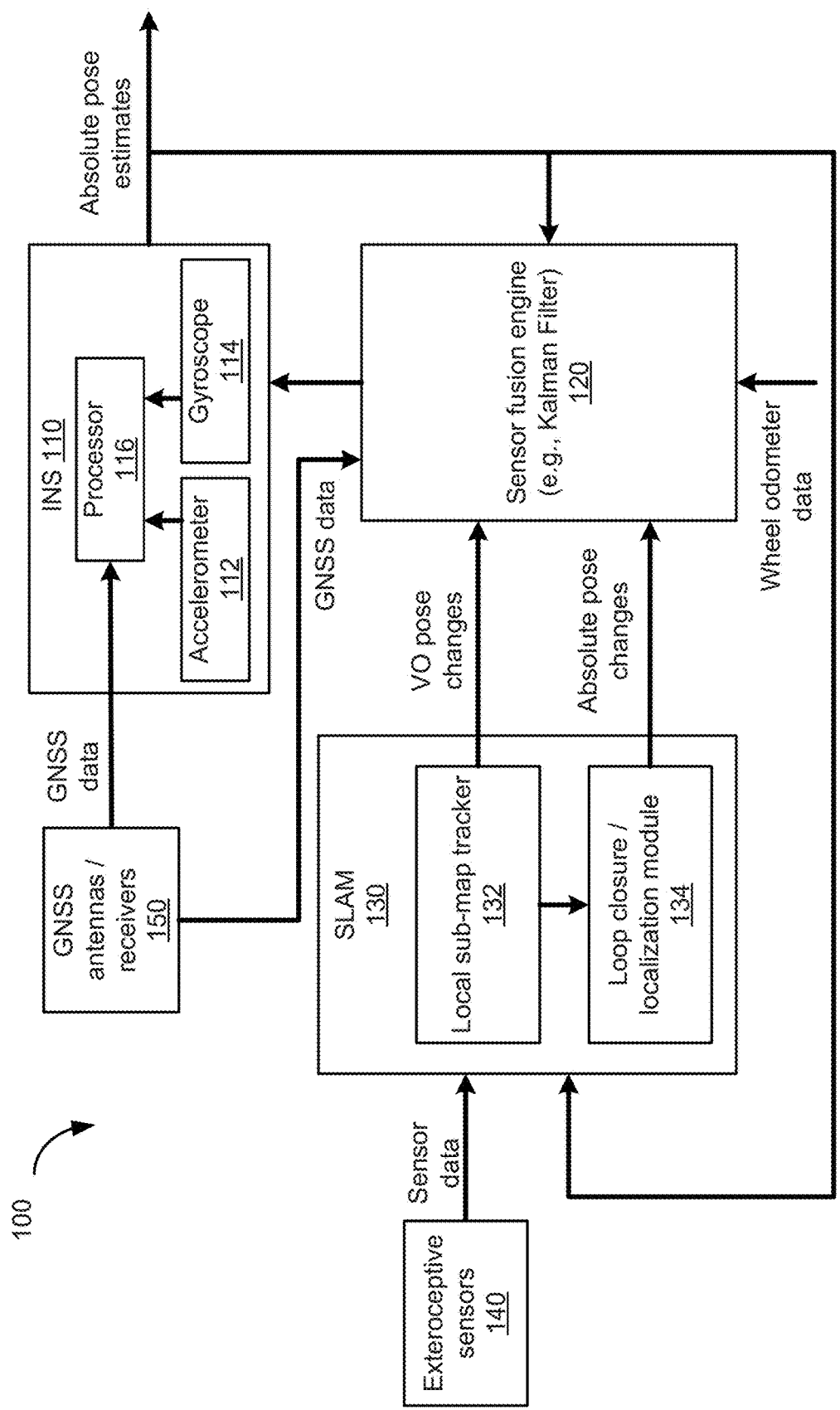
FIG. 1 shows a schematic block diagram of a navigation system for a dynamic platform according to some embodiments.

FIG. 1 shows a schematic block diagram of a navigation system 100 for a dynamic platform according to some embodiments. Dynamic platforms may refer to any moving objects. Dynamic platforms may include vehicles, such as ships, aircraft, submarines, guided missiles, spacecraft, cars, and the like. Dynamic platforms may also include robots, humans, and animals. The navigation system 100 includes an INS unit 110. The INS unit 110 may include a three-axis accelerometer 112 and a three-axis gyroscope 114, both attached to the dynamic platform. The three-axis accelerometer 112 may be configured to measure linear accelerations of the dynamic platform along three orthogonal spatial axes. For example, spatial positions in a three-dimensional (3D) space may be defined by a Cartesian coordinate system with three orthogonal axes X, Y, and Z. The three-axis gyroscope 114 may be configured to measure angular velocities of the dynamic platform along three orthogonal angular axes. For example, the angular axes may include the pitch, the yaw (e.g., the heading), and the roll axes.

The INS 110 may further include a computer processor 116 communicatively coupled to the accelerometer 112 and the gyroscope 114. The processor 116 may be configured to determine, in real-time, initial estimates of current positions and initial estimates of current orientations of the dynamic platform based on a previous position and a previous orientation of the dynamic platform, and the linear accelerations measured by the accelerometer 112 and the angular velocities measured by the gyroscope 114, using dead reckoning.

In some embodiments, the previous position of the dynamic platform may be provided by an external source. For example, the navigation system 100 may optionally include one or more GNSS antennas/receivers 150 for receiving GNSS signals. The processor 116 of the INS may be communicatively coupled to the GNSS antennas/receivers 150 for receiving GNSS data, and configured to determine an initial position fix based on the GNSS data. Alternatively, the GNSS antennas/receivers 150 may determine the initial position fix based on the GNSS signals, and the processor 116 receives the initial position fix from the GNSS antennas/receivers 150. After having the initial position fix, the processor 116 may update the positions and the orientations of the dynamic platform using the accelerometer data and the gyroscope data by dead reckoning.

In some embodiments, the previous position of the dynamic platform may be provided by other external sources or methods. For example, the previous position of the dynamic platform may be determined by referencing to one or more fixed targets with known absolute positions (in terms of longitudes and latitudes) using triangulation. The previous position of the dynamic platform may also be determined using SLAM as described below.

As discussed above, the pose updates by the INS 110 may be subject to drifts integrated over time. Therefore, the pose updates may need to be periodically corrected by additional data from other sources in order to provide more accurate estimates. According to some embodiments, the navigation system 100 further includes one or more exteroceptive sensors 140 attached to the dynamic platform, and a SLAM unit 130 communicatively coupled to the exteroceptive sensors 140. The SLAM unit 130 may be configured to process real-time image data acquired by the exteroceptive sensors 140 to provide the additional data for correcting the drifts in the position fixes by the INS 110, as described below.

The exteroceptive sensors 140 may include 3D sensors, such as lidars, stereo cameras, structured-light 3D sensors, radars, sonar sensors, and the like. Sensor data acquired by 3D sensors may include 3D images in the form of point clouds. A point cloud is a set of data points representing external surfaces of objects in a 3D space. The exteroceptive sensors 140 may also include two-dimensional (2D) sensors, such as 2D cameras. Sensor data acquired by 2D exteroceptive sensors may include 2D images, such as photographs, of a scene. 3D information may be obtained from 2D images using, for example, triangulation.

Lidar is a device that measures distance to a target by illuminating the target with a laser beam and measuring a reflected laser beam with a detector. For example, a lidar may be configured to measure distances based of the principle of time-of-flight (TOF). A laser pulse of a short duration is emitted from a laser source, and is reflected off of an object. The return laser pulse is detected by a detector. By measuring the round-trip time of the laser pulse from emission to detection, a distance from the lidar to the object may be determined. A lidar sensor may also use continuous-wave laser beams, such as frequency-modulated continuous-wave (FMCW) laser beams, to measure distances. By scanning a scene with laser beams, 3D point clouds of the scene may be obtained. An exemplary scanning lidar sensor that has been used for obstacle detection in autonomous vehicles uses rotating laser beams. Other types of scanning lidar sensors or array-based lidar sensors may also be used to acquire 3D point clouds.

The SLAM unit 130 is communicatively coupled to the exteroceptive sensors 140, and configured to process real-time sensor data acquired by the exteroceptive sensors 140. The SLAM unit 130 may include hardware and/or software to use the real-time sensor data to concurrently build a map of an environment in which the dynamic platform is traveling and locate the dynamic platform in the map.

Figure 2A:
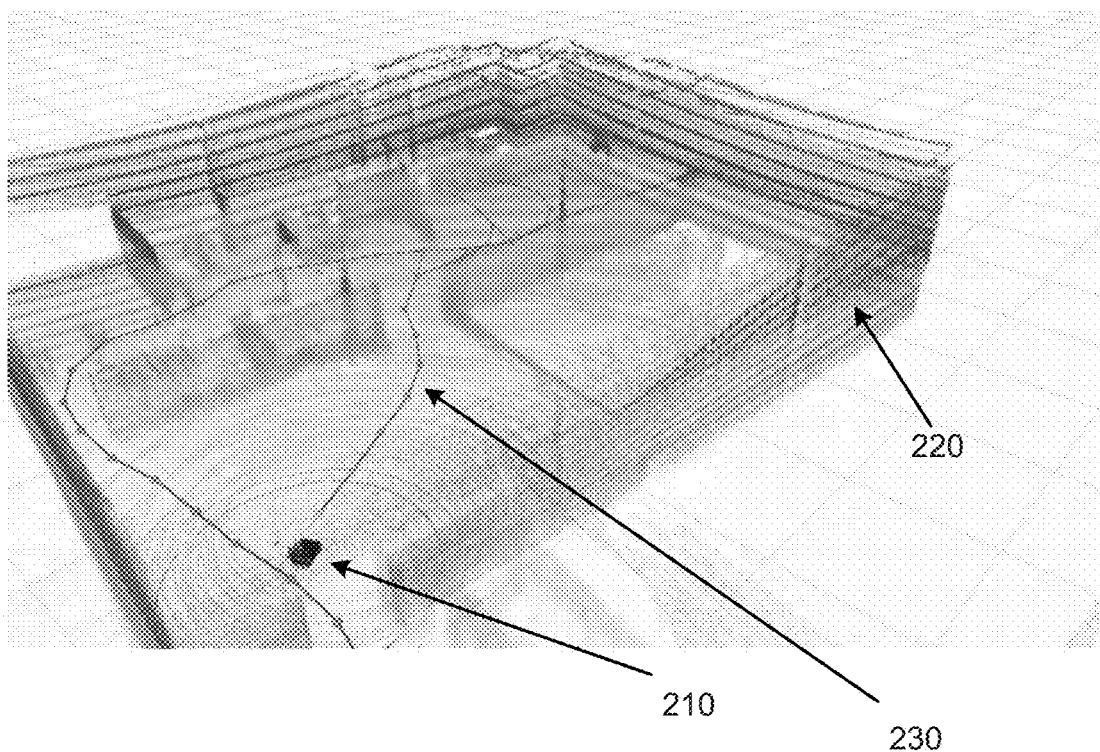
FIGS. 2A-2B and 3A-3B illustrate a simultaneous localization and mapping (SLAM) algorithm in action according to some exemplary embodiments.
Figure 2B:
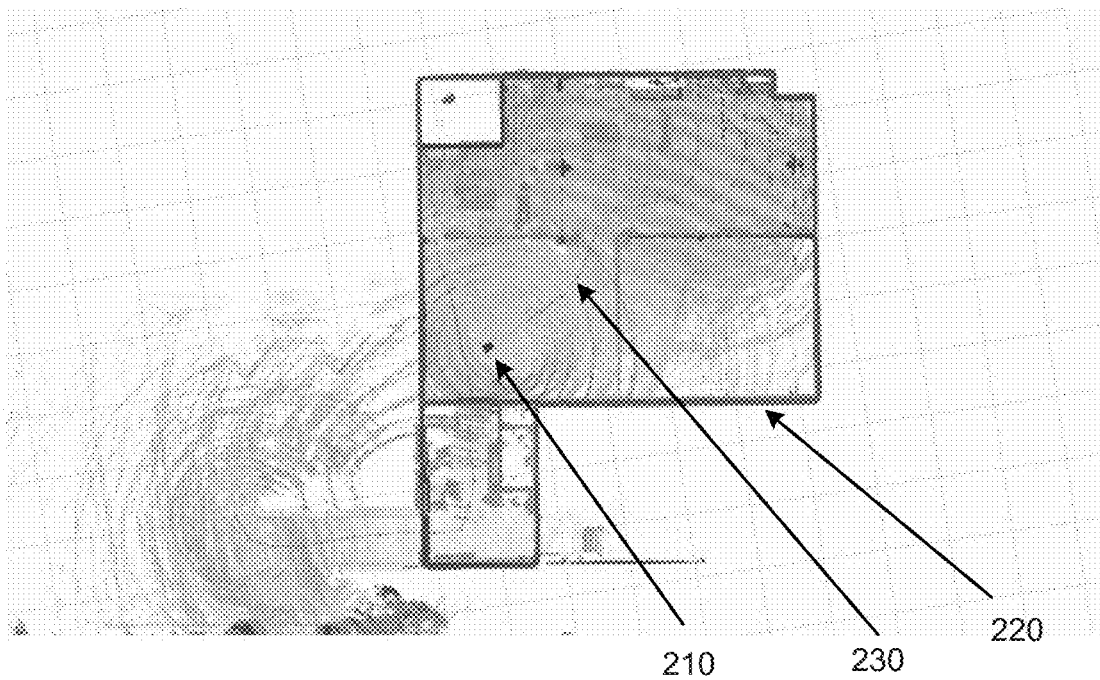

FIGS. 2A and 2B illustrate a SLAM algorithm in action according to some exemplary embodiments. A dynamic platform 210 may traverse the inside of a building (e.g., a warehouse). The dynamic platform 210 may be an autonomous vehicle or a vehicle manually driven. A lidar may be mounted on the top of the dynamic platform 210. As an example, the lidar may include a plurality of lasers (e.g., 16 lasers) stacked vertically. During operation, the lasers may spin about an axis at a certain rate (e.g., 10 revolutions per second). As the dynamic platform 210 is being driven around inside the building, the lidar may generate point clouds in real-time.

In FIG. 2A, the point cloud map acquired by the lidar and processed through SLAM up to the present time is represented by colored points in 3D, where different colors represent different vertical heights. For example, in FIG. 2A, a vertical wall 220 may be seen in purple, blue, and green colors at various heights: the purple colored points may represent the upper portion of the wall 220, the blue colored points may represent the middle portion of the wall 220, and the green colored points may represent the lower portion of the wall 220. The yellow colored points may represent the floor.

Figure 3A:
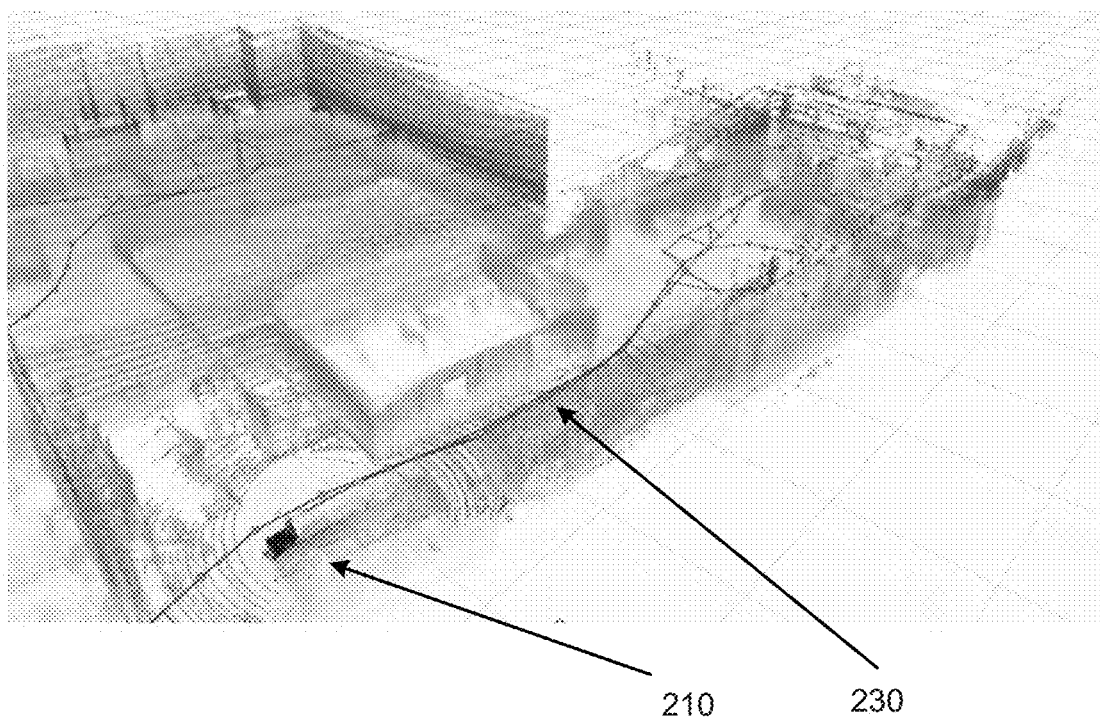
Figure 3B:
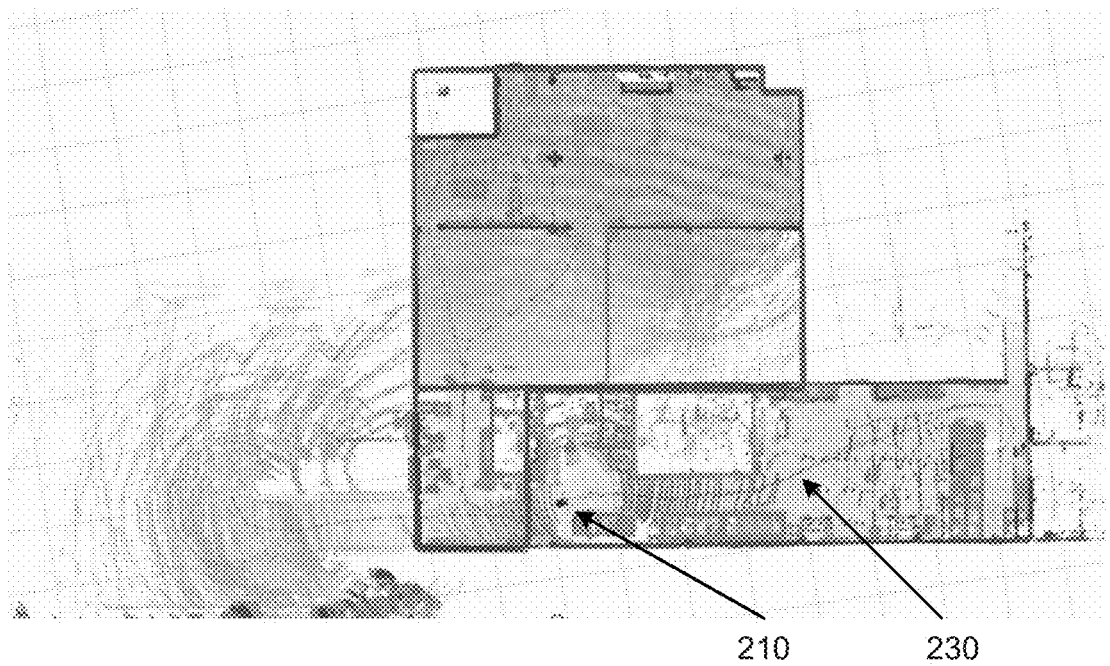

As the dynamic platform 210 is being driven inside the building, SLAM may simultaneously construct a map based on the point clouds and estimate the trajectory 230 (represented by the thin line) of the dynamic platform 210 within the map in real-time. FIG. 2B shows a 2D map of the interior of the building onto which the 3D point clouds are projected. The map and the trajectory 230 of the dynamic platform 210 is continuously updated as the dynamic platform is being driven around. FIGS. 3A and 3B show the 3D point clouds in 3D and the 2D map, respectively, at a later instant of time. As illustrated, at this later instant of time, the dynamic platform 210 has entered another room inside the building. Thus, the 2D map shown in FIG. 3B includes the other room, and the trajectory 230 of the dynamic platform 210 is extended to the other room as well.

Referring again to FIG. 1, according to some embodiments, the SLAM unit 130 may include a local sub-map tracker 132 and a loop closure and localization module 134. The local sub-map tracker 132 may be configured to use the real-time sensor data acquired by the exteroceptive sensors 140 to estimate visual odometer (VO) pose changes. A VO pose change is an incremental pose change of the dynamic platform, which may include an incremental change in the position and an incremental change in the orientation of the dynamic platform within a time interval. The position may have three degrees of freedom (e.g., coordinates in the X, Y, and Z axes), and the orientation may have three degrees of freedom (angles in the pitch, yaw, and roll axes). Unlike a wheel odometer which uses a rotary encoder to measure wheel rotations, visual odometry is the process of determining the pose (i.e., position and orientation) of a moving object by analyzing sequential images (e.g., 3D or 2D images).

A VO algorithm may include the following general steps according to some embodiments. First, a series of sequential images may be acquired by the exteroceptive sensors 140 at a series of discrete time steps. Image matching may be performed across the series of sequential images. The image matching process may establish correspondence of two sequential images using correlation. From the image matching, incremental relative motions of the exteroceptive sensors 140 (and thus the incremental relative motion of the dynamic platform) through the series of discrete time steps may be estimated.

In some embodiments in which lidars are used as exteroceptive sensors, the image matching may use an iterative closest point (ICP) algorithm. An ICP algorithm may seek to minimize the difference between two point clouds (e.g., acquired by lidars). One point cloud, referred to as the reference or target, may be fixed, while the other point cloud, referred to as the source, is transformed to best match the reference. The algorithm iteratively revises the transformation needed to minimize an error metric. The transformation may include a combination of translation and rotation. The error metric may be a distance from the source point cloud to the reference point cloud, such as the sum of squared differences between coordinates of the matched pairs. A final optimal transformation may be used to estimate the incremental relative motion of the exteroceptive sensors 140 (thus the incremental relative motion of the dynamic platform to which the exteroceptive sensor is attached). In some other embodiments, other correlation methods, such as optical flow, may be used to estimate the incremental relative motions cross the series of images.

The incremental relative motions of the exteroceptive sensors 140 may be expressed in six degrees of freedom, which include three degrees of freedom in position (e.g., X, Y, and Z coordinates) and three degrees of freedom in orientation (e.g., pitch, yaw, and roll angles). Using a graphical representation, poses may be represented by nodes of a graph. Odometry information consisting of pose change may be encapsulated as an edge (or connection) between two nodes. A collection of nodes and the relative transformations defining the linkages between nodes is referred to as a pose graph. The pose represented at each node is equivalent to a local reference frame. A node or local reference frame with associated exteroceptive sensor data is referred to herein as a keyframe. As with most dead reckoning methods, the initial placement of nodes may be subject to drifts.

In some embodiments, the local sub-map tracker 132 may perform visual odometry from frame to frame. That is, the VO algorithm may perform image matching between consecutive frames. For instance, in the example illustrated in FIGS. 2A-2B and 3A-3B, the lidar may acquire point clouds at a rate of 10 frames per second (e.g., for a spinning lidar spinning at 10 revolutions per second and acquiring point clouds at 1 frame per revolution). Frame-to-frame visual odometry may be more vulnerable to drifts, especially when the environment has dynamic objects. For example, if there is a truck driving in front of the exteroceptive sensor 140 in a certain direction, the local sub-map tracker 132 may perceive that the exteroceptive sensor 140 is moving in a direction opposite to the direction in which the truck is moving, even when the exteroceptive sensor 140 is stationary.

According to some other embodiments, the local sub-map tracker 132 may perform visual odometry using keyframes. A frame may be selected as a new keyframe after the dynamic ploatform as moved a set distance. By performing keyframe-based visual odometry, the sub-map tracker 132 may be less likely to track moving objects, thus reducing drifts.

Figure 4:
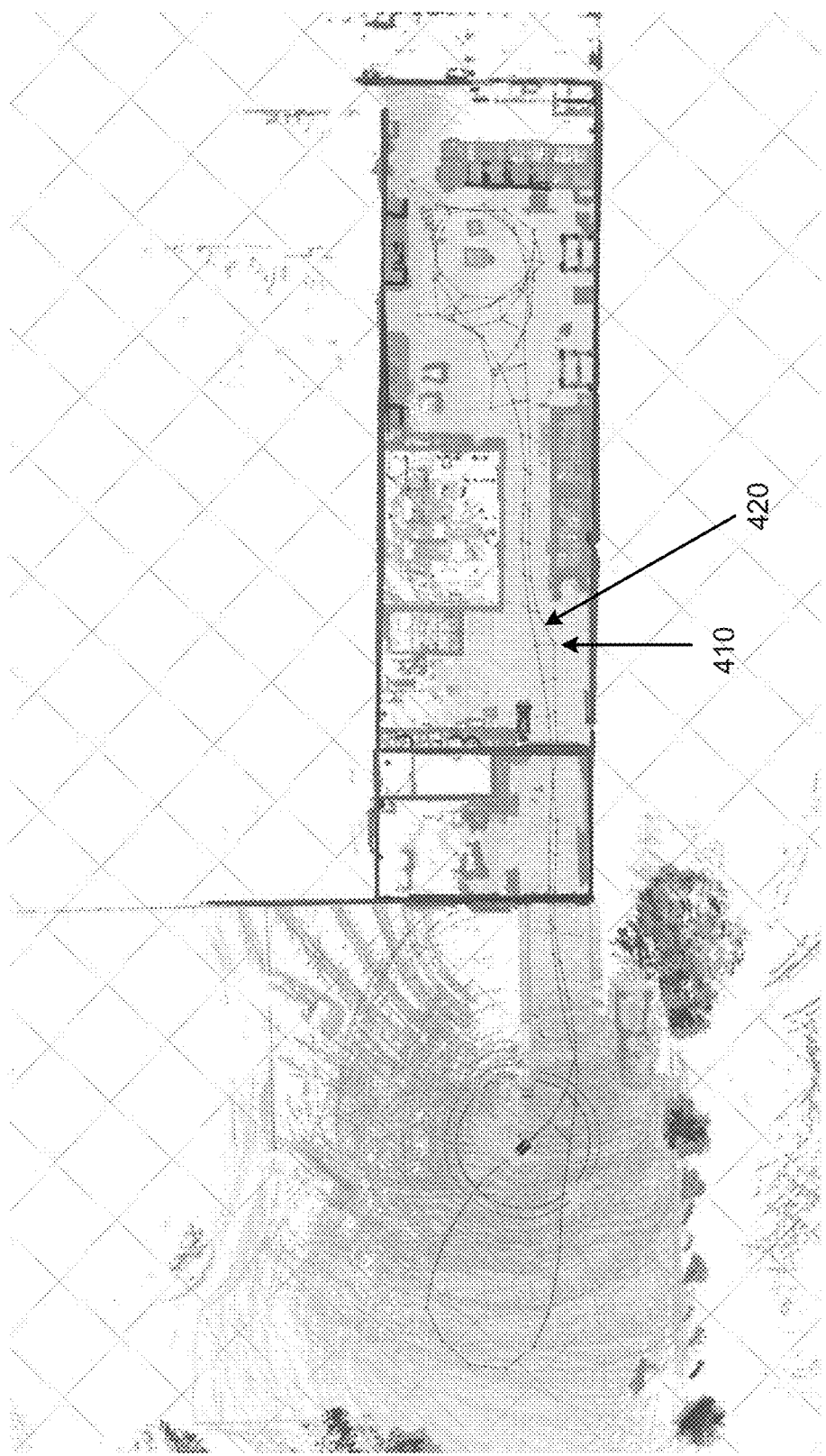
FIG. 4 shows an exemplary pose graph obtained by SLAM according to some embodiments.

As discussed above, the local sub-map tracker 132 may compute an incremental relative pose change from frame to frame (or keyframe) using visual odometry. The local sub-map tracker 132 may place initial nodes in a pose graph by dead reckoning. FIG. 4 shows an exemplary pose graph obtained by SLAM according to some embodiments. In this example, each green dot 410 is a node representing an estimated pose for a respective keyframe. The blue segments 420 connecting the green dots represent pose changes between adjacent keyframes.

As discussed above, the poses determined by visual odometry may be subject to drifts due to estimation errors. Such drifts may cause the nodes in a pose graph to be inconsistent with each other. For example, when a dynamic platform traverses a same location twice, because of drifts, two nodes corresponding to the same location may not coincide with other. Therefore, once an initial pose graph is constructed, the configuration of the nodes may need to be optimized or rearranged so that the nodes most closely represent the actual locations.

Referring again to FIG. 1, the loop closure and localization module 134 of the SLAM unit 130 may be configured to "augment" the pose graph by adding connections between certain nodes in the pose graph. Loop closure may recognize a previously visited location, and match the image (e.g., a point cloud) of a later frame (or keyframe) against the image of a previous frame (or keyframe). Loop closure may also match higher level features. For instance, in the example shown in FIG. 4, the red segments are loop closure connections. Each node represented by a green dot may have a point cloud associated with it. Loop closure may match the point clouds associated with two nodes connected by a red edge. Loop closure may insert pose constraints that define the estimated relative transformation between keyframes.

Figure 5A:
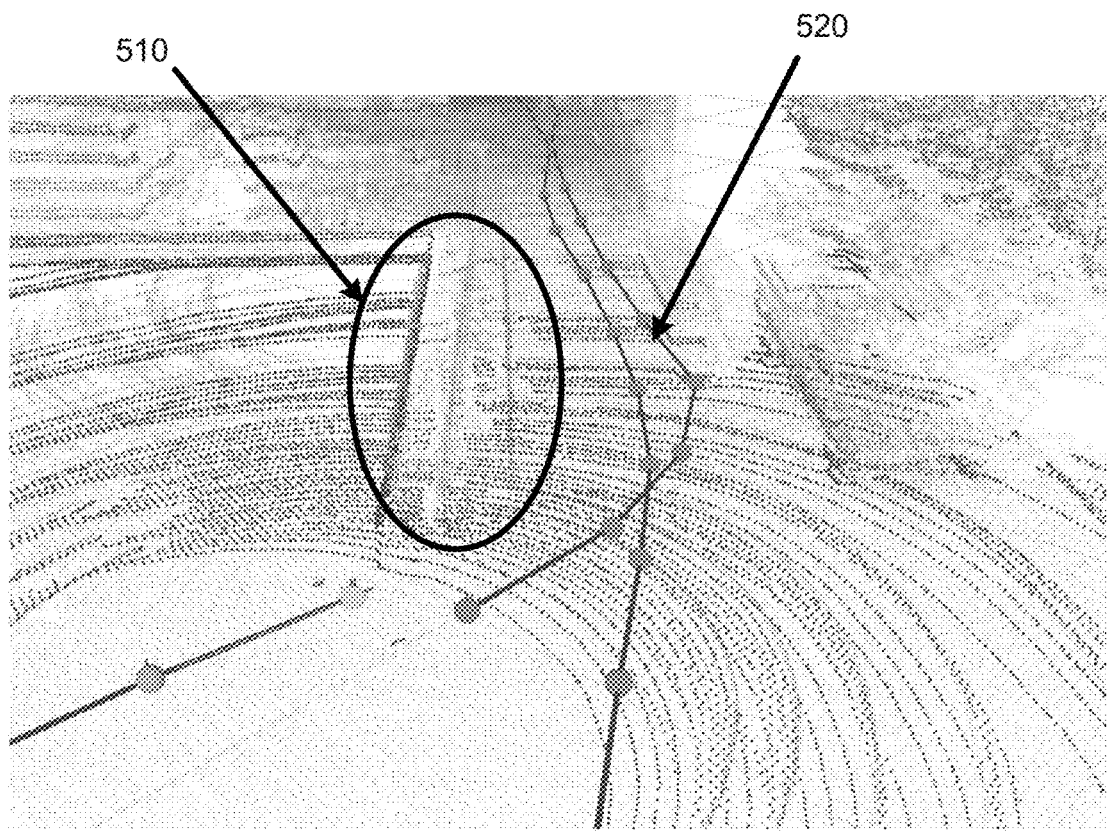
FIGS. 5A and 5B show exemplary pose graphs before and after loop closure, respectively, according to some embodiments.
Figure 5B:
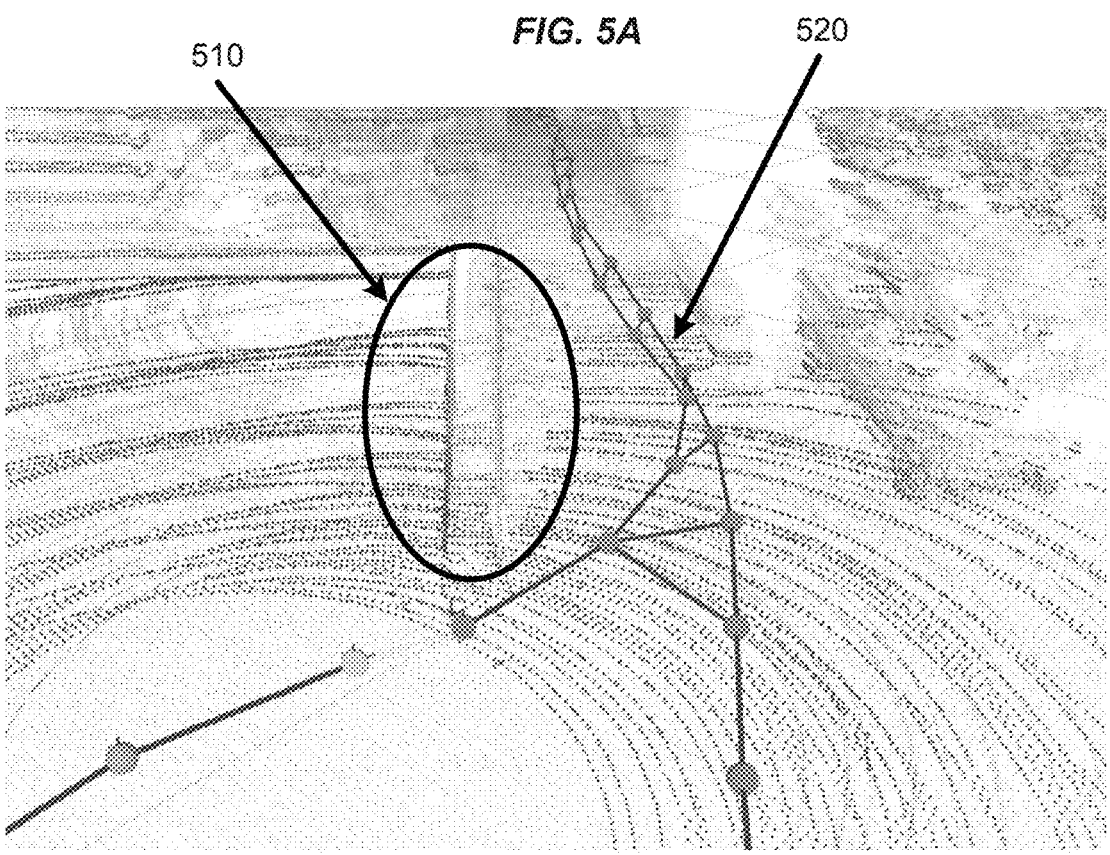

Loop closure can reduce drifts caused by dead reckoning in the visual odometry processes. FIGS. 5A and 5B show exemplary pose graphs before and after loop closure, respectively, according to some embodiments. As illustrated in FIG. 5A, before loop closure, there are three lines in the circled region 510. After loop closure, there are only two lines in the circled region 510, as illustrated in FIG. 5B. One of the three lines in FIG. 5A is a ghost line caused by drifts. Also, as illustrated in FIGS. 5A and 5B, the trajectory 520 of the dynamic platform is also corrected after loop closure. The process of recognizing a current location of the dynamic platform within a map is referred herein as localization.

Additionally, the loop closure and localization module 134 may perform a batch optimization according to some embodiments. In the batch optimization, the loop closure and localization module 134 may take in all the keyframes and loop closures to estimate a most likely map and more accurate poses. The updated map may be used for further loop closure detection.

In some embodiments, a previously generated map (e.g., generated offline) may be used for determining a current location of the dynamic platform in the local frame of the map. If the absolute coordinates (e.g., in terms of longitude and latitude) of points or landmarks within the map are known, the current location and orientation of the dynamic platform in a global frame (e.g., location in terms of longitude and latitude coordinates, orientation relative to North, East and Down) may be determined by localizing the dynamic platform within the map. Thus, the loop closure and localization module 134 may provide a starting position for the INS 110, or provide additional data to periodically correct the position fixes by the INS 110. This may be useful in situations in which GNSS coverage is not available or is poor.

Referring again to FIG. 1, the loop closure and localization module 134 may output an absolute pose change. The absolute pose change may include an absolute position change and an absolute orientation change of the dynamic platform in a local frame. For example, the local frame may be the map that the SLAM module 130 is building.

The navigation system 100 may further include a sensor fusion engine 120. In some embodiments, the sensor fusion engine 120 may comprise a Kalman filter. The sensor fusion engine 120 is coupled to the INS 110 and the SLAM unit 130. The output of the INS 110, which may include estimates of absolute current positions and estimates of absolute current orientations of the dynamic platform (e.g., estimates of absolute poses), is input into the sensor fusion engine 120. The output of the INS 110 may also include estimated errors of the estimates of absolute current positions and the estimates of absolute current orientations. The VO pose changes estimated by the local sub-map tracker 132 and the absolute pose changes estimated by the loop closure and localization module 134 are also input into the sensor fusion engine 120. The SLAM unit 130 may also output estimated errors of the VO pose changes and estimated errors of the absolute pose changes to the sensor fusion engine 120. The sensor fusion engine 120 may also take in other aiding measurements from other sensors, such as wheel odometers (in cases where the dynamic platform is a land vehicle) and GNSS.

The sensor fusion engine 120 may use the inputs from the INS 110 and the SLAM unit 130 to produce estimates of current positions and estimates of current orientations that tend to be more accurate than those based solely on the INS 110. In some embodiments, the sensor fusion engine may work in a two-step process. In a prediction step, the sensor fusion engine 120 may produce estimates of current positions and estimates of current orientations, along with their uncertainties. Once the outcome of the next measurements (e.g., the inputs from the INS 110 and the SLAM unit 130) are observed, the estimates may be updated using a weighted average of the measurements. The weighting in the average may be based on the errors associated with measurements. For example, more weights may be given to measurements with higher certainly (i.e., less errors). The sensor fusion engine 120 may also estimate errors of the estimates of current positions and errors of the estimates of current orientations. The sensor fusion engine 120 may further estimate sensor errors, such as the errors of linear accelerations and errors of the angular velocities measured by the three-axis accelerometer 112 and the three-axis gyroscope 114, respectively, as well as errors of the GNSS data and/or errors of the wheel odometer data.

The algorithm is recursive, and can run in real-time. The sensor fusion engine 120 and the INS 110 form a closed loop, where the sensor fusion engine 120 continuously updates the estimates using the present inputs and the previous estimates along with an uncertainty covariance matrix. The processor 116 of the INS 110 also continuously updates the absolute current positions and the absolute current orientations of the dynamic platform using the input from the sensor fusion engine 120, as well as the linear accelerations measured by the accelerometer 112 and the angular velocities measured by the gyroscope 114. In addition, the SLAM unit 130 may use the input from the INS 110 to aid the estimation of the VO pose changes and the absolute pose changes. In this way, the SLAM solutions may also incorporate other sensor measurements, such as GNSS data and inertial data.

In some embodiments, the accelerometer 112 and the gyroscope 114 may measure linear accelerations and the angular velocities, respectively, at a first rate. The local sub-map tracker 132 may provide VO pose changes at a second rate that is slower than the first rate. For example, the first rate may be about 200 Hz, and the second rate may be about 10 Hz. Thus, the position fixes by the INS 110 may be periodically corrected at the second rate. In some embodiments, the loop closure and localization module 134 may provide absolute pose updates at the frame rate of the exteroceptive sensors 140. In some other embodiments, the loop closure and localization module 134 may output at a rate slower than the frame rate, as even infrequent absolute pose updates can correct the overall drift. The sensor fusion engine 120 may update the estimates at a rate equal to or slower than the second rate.

As described above, the navigation system 100 for a dynamic platform according to embodiments of the present invention uses an INS assisted by a SLAM module, where the INS determines current positions of the dynamic platform using a starting position and dead reckoning, and the SLAM module provides correction data periodically for the INS to correct any drifts caused by noise. Such a navigation system may provide navigation without a GNSS receiver, or in situations where GNSS coverage is not available or poor (e.g., when the dynamical platform, such as a vehicle, passes through a tunnel or between tall buildings).

Figure 6:
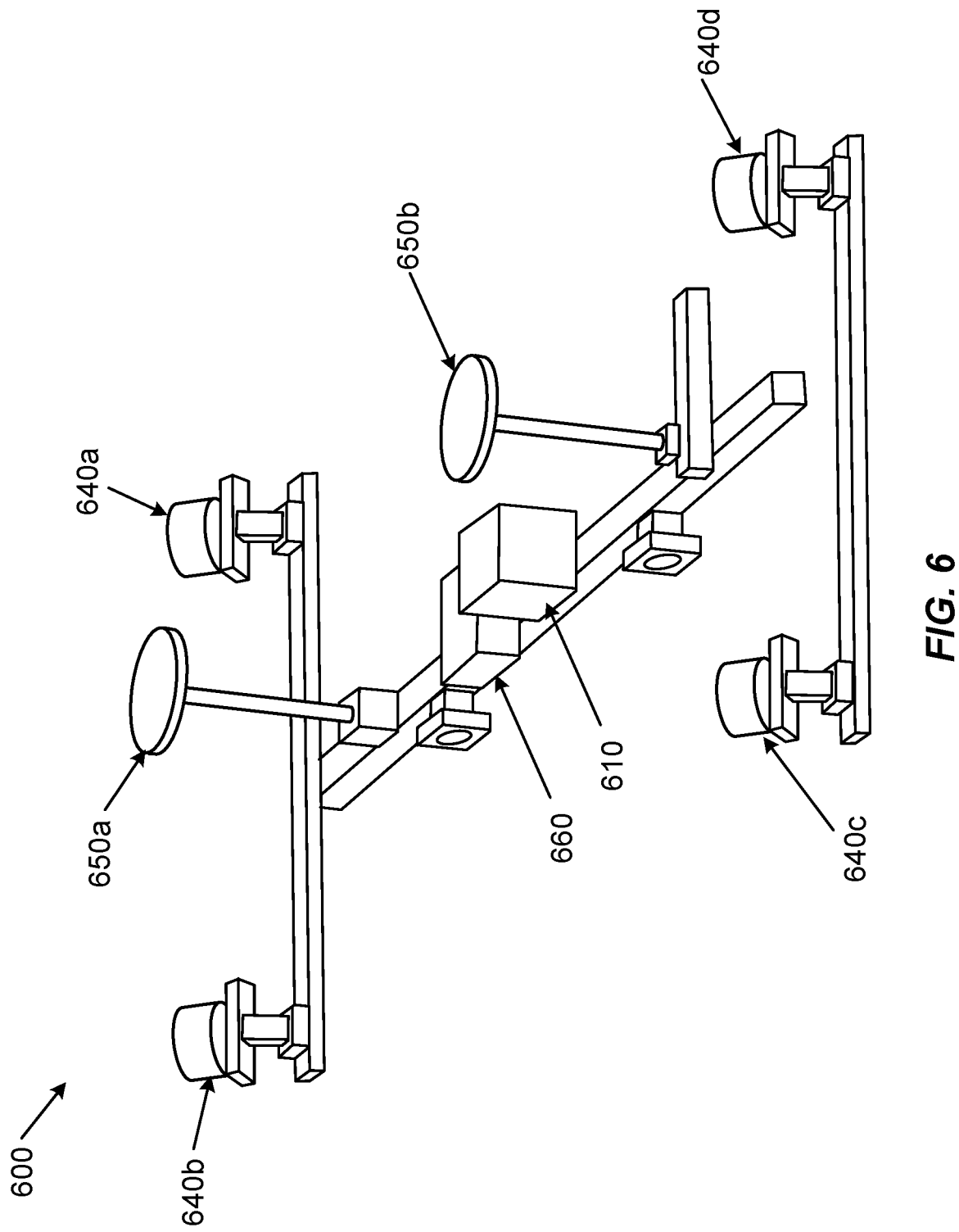
FIG. 6 shows an exemplary sensor rig configured to be mounted on a roof of a car as part of a SLAM assisted inertial navigation system (INS) according to some embodiments.

FIG. 6 shows an exemplary sensor rig 600 configured to be mounted on a roof of a car as part of a SLAM assisted INS according to some embodiments. The sensor rig 600 may include an IMU 610, which may include a three-axis accelerometer and a three-axis gyroscope. The IMU 610 may be configured to measure linear accelerations and angular velocities of the car, to be used by the INS for dead reckoning.

The sensor rig 600 may further include one or more exteroceptive sensors 640*a-d*. In some embodiments, the exteroceptive sensors 640*a-d* may be lidars configured to acquire 3D point clouds of an environment in which the car is traveling. As an example, each lidar may include laser sources (e.g., 16 laser sources) and detectors that spin about a rotation axis at certain rate (e.g., 10 Hz). Therefore, each lidar may have a 360 degree field of view in the direction perpendicular to the rotation axis. Each lidar may have a detection range of about 100 m, and a spatial resolution of about 3 cm. The point clouds acquired by the lidars in real-time may be used by a SLAM unit for determining positions of the car, for periodically correcting the position fixes by the INS, as described above. It should be understood that the sensor rig 600 may include fewer than or more than four lidars. The sensor rig 600 may also include other types of exteroceptive sensors, such as cameras or radars.

The sensor rig 600 may optionally include one or more GNSS antennas 650*a-b* for receiving GNSS signals. The GNSS signals may be used to provide an initial position of the car to the INS, so that the INS may determine absolute positions thereafter by dead reckoning. The GNSS signals may also be used to provide corrections to the position fixes by the INS where there is GNSS coverage. In some embodiments, the sensor rig 600 may include two GNSS antennas 650*a* and 650*b*. By using a carrier phase differential GNSS algorithm to measure the relative position vector between the two GNSS antennas 650*a* and 650*b*, azimuth corrections may be provided to the INS to ensure that azimuth does not drift.

The sensor rig 600 may further include a computer system 660. The computer system 660 may include GNSS receivers communicatively coupled to the GNSS antennas 650*a-b*. The computer system 660 may also include data processing unit and power distribution unit for other sensor components. For example, the computer system 660 may include a SLAM unit communicatively coupled to the exteroceptive sensors 640*a-d* for performing SLAM using the images acquired by the exteroceptive sensors 640*a-d*. The computer system 660 may also include a sensor fusion engine communicatively coupled to the SLAM unit and the IMU 610. The sensor fusion engine may be configured to update estimated positions and orientations of the car using the various sensor data, as discussed above. In some embodiments, the computer system 660 may be located somewhere else in the car, and may be communicatively coupled to the various sensors via a cable harness or wirelessly.

Figure 7:
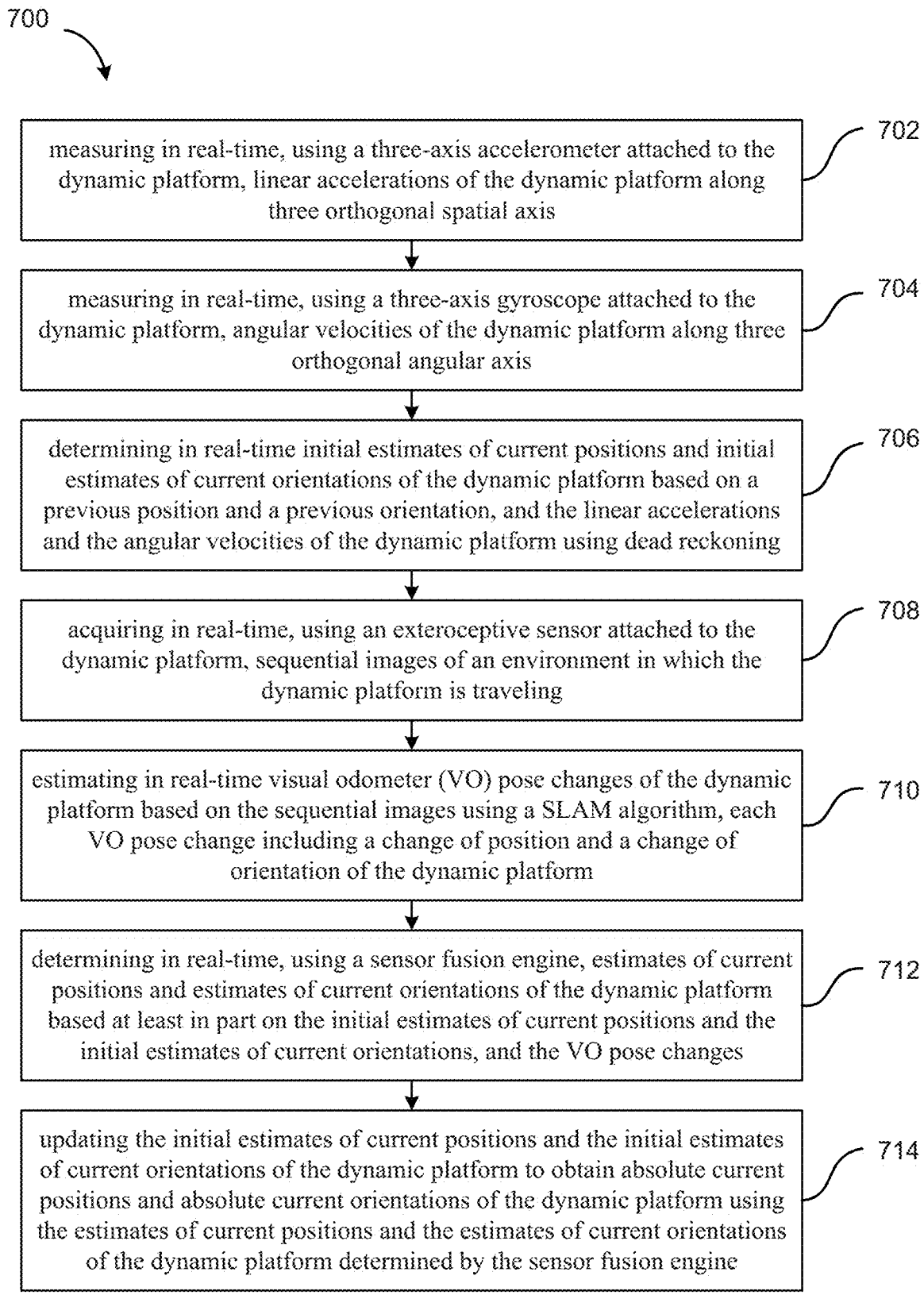
FIG. 7 shows a flowchart illustrating a method of navigation for a dynamic platform according to some embodiments.

FIG. 7 shows a flowchart illustrating a method 700 of navigation for a dynamic platform according to some embodiments.

The method 700 includes, at 702, measuring in real-time, using a three-axis accelerometer attached to the dynamic platform, linear accelerations of the dynamic platform along three orthogonal spatial axis.

The method 700 further includes, at 704, measuring in real-time, using a three-axis gyroscope attached to the dynamic platform, angular velocities of the dynamic platform along three orthogonal angular axis.

The method 700 further includes, at 706, determining in real-time initial estimates of current positions and initial estimates of current orientations of the dynamic platform based on a previous position and a previous orientation, and the linear accelerations and the angular velocities of the dynamic platform using dead reckoning.

The method 700 further includes, at 708, acquiring in real-time, using an exteroceptive sensor attached to the dynamic platform, sequential images of an environment in which the dynamic platform is traveling.

The method 700 further includes, at 710, estimating in real-time visual odometer (VO) pose changes of the dynamic platform based on the sequential images using a SLAM algorithm. Each VO pose change includes a change of position and a change of orientation of the dynamic platform.

The method 700 further includes, at 712, determining in real-time, using a sensor fusion engine, estimates of current positions and estimates of current orientations of the dynamic platform based at least in part on the initial estimates of current positions and the initial estimates of current orientations, and the VO pose changes.

The method 700 further includes, at 714, updating the initial estimates of current positions and the initial estimates of current orientations of the dynamic platform to obtain absolute current positions and absolute current orientations of the dynamic platform using the estimates of current positions and the estimates of current orientations of the dynamic platform determined by the sensor fusion engine.

It should be appreciated that the specific steps illustrated in FIG. 7 provide a particular method of navigation for a dynamic platform according to some embodiments of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A navigation system for a dynamic platform, the navigation system comprising:
    an inertial navigation system (INS) unit comprising:
        a three-axis accelerometer attached to the dynamic platform for measuring, in real-time, linear accelerations of the dynamic platform along three orthogonal spatial axes;
        a three-axis gyroscope attached to the dynamic platform for measuring, in real-time, angular velocities of the dynamic platform along three orthogonal angular axes; and
        a processor communicatively coupled to the accelerometer and the gyroscope, the processor configured to determine in real-time, using dead reckoning, initial estimates of current positions and initial estimates of current orientations of the dynamic platform based on a previous position and a previous orientation of the dynamic platform, and the linear accelerations and angular velocities of the dynamic platform;
    an exteroceptive sensor attached to the dynamic platform and configured to acquire, in real-time, sequential images of an environment in which the dynamic platform is traveling; and
    a data processing unit comprising:
        a simultaneous localization and mapping (SLAM) unit coupled to the exteroceptive sensor, the SLAM unit comprising:
            a local sub-map tracker configured to: (i) estimate, in real-time, visual odometer (VO) pose changes of the dynamic platform using the sequential images, each VO pose change including a change of position and a change of orientation of the dynamic platform, and (ii) determine a plurality of estimated nodes in a pose graph using the sequential images, each estimated node representing an estimated pose of the dynamic platform corresponding to a respective image of the sequential images; and
            a loop closure and localization module configured to: (i) optimize the pose graph to obtain a plurality of optimized nodes in the pose graph, each optimized node representing an optimized pose of the dynamic platform, and (ii) estimate absolute pose changes of the dynamic platform based on the plurality of optimized nodes; and
        a sensor fusion engine communicatively coupled to the INS unit and the SLAM unit, the sensor fusion engine configured to determine estimates of current positions and estimates of current orientations of the dynamic platform based at least in part on the initial estimates of current positions and the initial estimates of current orientations determined by the INS unit, the VO pose changes estimated by the local sub-map tracker, and the absolute pose changes estimated by the loop closure and localization module;
    wherein the processor of the INS unit is further configured to update the initial estimates of current positions and the initial estimates of current orientations of the dynamic platform to obtain absolute current positions and absolute current orientations of the dynamic platform using the estimates of current positions and the estimates of current orientations of the dynamic platform determined by the sensor fusion engine; and
    wherein the absolute current positions and absolute current orientations of the dynamic platform are used for navigating the dynamic platform.

2. The navigation system of claim 1 wherein the sensor fusion engine is further configured to estimate errors of the estimates of current positions and errors of the estimates of current orientations.

3. The navigation system of claim 1 wherein the exteroceptive sensor comprises one or more lidars, or one or more cameras.

4. The navigation system of claim 1 wherein:
    the processor of the INS unit is configured to determine the initial estimates of current positions and the initial estimates of current orientations of the dynamic platform at a first rate;
    the local sub-map tracker of the SLAM unit is configured to estimate the VO pose changes of the dynamic platform at a second rate slower than the first rate;
    the sensor fusion engine is configured to determine estimates of current positions and estimates of current orientations of the dynamic platform at a third rate equal to slower than the second rate; and
    the processor of the INS unit is configured to update the initial estimates of current positions and the initial estimates of current orientations of the dynamic platform at the third rate.

5. The navigation system of claim 1 wherein determining the estimates of current positions and the estimates of current orientations of the dynamic platform by the sensor fusion engine is further based on estimated errors of the initial estimates of current positions and estimated errors of the initial estimates of current orientations as determined by the INS unit, estimated errors of the VO pose changes as estimated by the local sub-map tracker, and estimated errors of the absolute pose changes as estimated by the loop closure and localization module.

6. The navigation system of claim 1 wherein the loop closure and localization module optimizes the pose graph using a loop closure algorithm.

7. The navigation system of claim 1 wherein the loop closure and localization module is further configured to build, in real-time, a map of the environment in which the dynamic platform is traveling based on the sequential images and the optimized nodes.

8. The navigation system of claim 1 wherein:
    the SLAM unit has previously built a map of the environment in which the dynamic platform is traveling; and
    the loop closure and localization module is further configured to determining an absolute location of the dynamic platform within the map.

9. The navigation system of claim 1 wherein the local sub-map tracker is configured to estimate the VO pose changes by performing, in real-time, image matching from one image to a next image in the sequential images.

10. The navigation system of claim 9 wherein:
the exteroceptive sensor comprises a lidar sensor;
the sequential images comprise sequential point clouds acquired by the lidar sensor; and
the local sub-map tracker performs the image matching by matching the sequential point clouds using an iterative closest point (ICP) algorithm.

11. A method of navigation for a dynamic platform, the method comprising:
measuring in real-time, using a three-axis accelerometer attached to the dynamic platform, linear accelerations of the dynamic platform along three orthogonal spatial axis;
measuring in real-time, using a three-axis gyroscope attached to the dynamic platform, angular velocities of the dynamic platform along three orthogonal angular axis;
determining in real-time initial estimates of current positions and initial estimates of current orientations of the dynamic platform based on a previous position and a previous orientation, and the linear accelerations and the angular velocities of the dynamic platform using dead reckoning;
acquiring in real-time, using an exteroceptive sensor attached to the dynamic platform, sequential images of an environment in which the dynamic platform is traveling;
estimating in real-time visual odometer (VO) pose changes of the dynamic platform based on the sequential images using a SLAM algorithm, each VO pose change including a change of position and a change of orientation of the dynamic platform;
determining a plurality of estimated nodes in a pose graph based on the sequential images using the SLAM algorithm, each estimated node representing an estimated pose of the dynamic platform corresponding to a respective image of the sequential images;
optimizing the pose graph using the SLAM algorithm to obtain a plurality of optimized nodes in the pose graph, each optimized node representing an optimized pose of the dynamic platform;
estimating absolute pose changes of the dynamic platform based at least on the plurality of optimized nodes using the SLAM algorithm;
determining in real-time, using a sensor fusion engine, estimates of current positions and estimates of current orientations of the dynamic platform based at least in part on the initial estimates of current positions and the initial estimates of current orientations, the VO pose changes, and the absolute pose changes;
updating the initial estimates of current positions and the initial estimates of current orientations of the dynamic platform to obtain absolute current positions and absolute current orientations of the dynamic platform using the estimates of current positions and the estimates of current orientations of the dynamic platform determined by the sensor fusion engine; and
navigating the dynamic platform using the absolute current positions and absolute current orientations of the dynamic platform.

12. The method of claim 11 wherein estimating the VO pose changes of the dynamic platform comprises performing image matching between consecutive images among the sequential images.

13. The method of claim 12 wherein the sequential images comprise sequential point clouds, and wherein the image matching is performed using an iterative closest point (ICP) algorithm.

14. The method of claim 11 wherein the sequential images comprise a plurality of frames, and wherein estimating the VO pose changes of the dynamic platform comprises:
selecting a plurality of keyframes from the plurality of frames; and
performing image matching between each current frame and a respective previous keyframe.

15. The method of claim 11 wherein estimating the absolute pose changes of the dynamic platform is further based on the absolute current positions and the absolute current orientations of the dynamic platform.

16. The method of claim 11 wherein optimizing the pose graph is performed using loop closure detection.

17. The method of claim 11 further comprising building, in real-time, a map of the environment in which the dynamic platform is traveling based on the sequential images and the optimized nodes.

18. The method of claim 11 further comprising determining an absolute location of the dynamic platform within a previously generated map of the environment in which the dynamic platform is traveling.

* * * * *